Patented July 10, 1934

1,966,126

UNITED STATES PATENT OFFICE 1,966,126

HALOGEN-BENZOPHENONE-DICARBOXYLIC ACIDS AND HALOGEN-ANTHRAQUINONE-CARBOXYLIC ACIDS AND A PROCESS OF PREPARING THEM

Georg Kränzlein, Martin Corell, and Ernst Diefenbach, Frankfort-on-the-Main, Germany, assignors to General Aniline Works, Inc., New York, N. Y., a corporation of Delaware No Drawing. Application November 3, 1932, Serial No. 641,120. In Germany November 13, 1931

6 Claims. (Cl. 260—57)

The present invention relates to halogen-benzophenone-dicarboxylic acids and halogen-anthraquinone-carboxylic acids and a process of preparing them.

We have found that benzophenone compounds which contain in one benzene nucleus a methyl group in ortho-position to the ketonic group and in the same benzene nucleus a further methyl group and a chlorine atom as substituents and which contain in the other benzene nucleus at least one unsubstituted ortho-position to the ketonic group, may be completely chlorinated in the methyl groups, in the absence or the presence of a diluent, and that there are formed in an easy manner and with a very good yield the corresponding ω-trichloro-compounds. These compounds separate in a very pure state if the chlorination is performed in an indifferent solvent as, for instance, trichlorobenzene or tetrachlorethane, preferably whilst exposing the reaction mixture to a natural or artificial source of light, for example, to ultraviolet rays and carrying out the reaction at temperatures between about 140° C. and about 180° C.

Furthermore, we have found that by saponifying these ω-trichloro compounds with concentrated sulfuric acid, there are obtained with simultaneous ring-closure, in a very pure state, from the pure completely ω-chlorinated chloromethyl-benzophenones the corresponding chloroanthraquinone-carboxylic acids, or, from the incompletely ω-chlorinated chloro-methyl-benzophenones, the corresponding aldehydes By treating the chlorination products of the benzophenones with a saponifying agent other than concentrated sulfuric acid, for instance, with a caustic alkali, the corresponding benzophenone-carboxylic acids or aldehydes are obtained which may be condensed (ringclosed) by means of concentrated sulfuric acid to the anthraquinone-carboxylic acids or aldehydes.

It is surprising that the starting material of the present process, i. e. a xylene which is substituted by two acid groups, namely chlorine and the benzoyl group, may be completely chlorinated in the methyl groups in such an easy manner and with such a good yield, since it is known that unsubstituted xylenes may be converted into ω-hexabromo-xylenes only in a wholly incomplete manner and that the introduction of further substituents, especially acid ones, into the benzene nucleus, in general, renders the chlorination in the side chain difficult or even impossible.

According to the present invention it is possible to prepare on an industrial scale and in an easy way halogen-benzophenone-dicarboxylic acids and halogen-anthraquinone-carboxylic acids and the corresponding aldehydes, some of which are new, for instance, the product of the following formula:

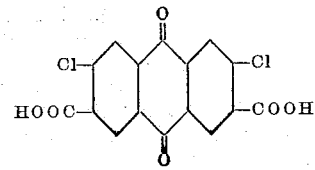

which is a valuable intermediate product for the preparation of dyestuffs.

The following examples serve to illustrate the invention but they are not intended to limit it thereto, the parts being by weight:

(1) 60 parts of 2.5-dimethyl-4-chlorobenzophenone, melting at 50° C. and obtainable by condensation of 2-chloro-para-xylene with benzoyl chloride according to the method of Friedel-Crafts, are dissolved in 120 parts of trichlorobenzene and treated with chlorine at about 170° C. to about 180° C. for about 24 hours, while vigorously stirring and exposing the reaction mixture to ultraviolet light. The reaction is finished as soon as a test portion, on cooling, solidifies to a crystalline magma. After cooling, the whole is filtered by suction and the solid matter is washed with a small quantity of cold alcohol. The ω - hexachloro-2.5-dimethyl-4-chlorobenzophenone thus obtained melts at 182° C.

60 parts of the product thus obtained are suspended in 600 parts of concentrated sulfuric acid and gradually heated to about 80° C. to about 90°. Hence, the product dissolves to a yellow solution with strong evolution of hydrochloric acid. After a short time, the reaction is finished. The reaction mixture is poured into water, whereby 2-chloro-anthraquinone-3-carboxylic acid separates in a pure state. In the dry state it melts at 280° C.

(2) 175 parts of 2.5.4'-trimethyl-4.5'-dichlorobenzophenone, melting at 54° C. and obtainable by condensation of 2-chloro-para-xylene with 3-chloro-4-methylbenzoic acid chloride according to the method of Friedel-Crafts, are chlorinated at about 170° C.—about 180° C. in 175 parts of trichlorobenzene, while intensely stirring and exposing the mixture to ultraviolet light. As in Example 1, there precipitates, on cooling, in a crystalline form, the product which is completely chlorinated in the methyl groups. It melts at 230° C. It is filtered with suction and washed with a small quantity of cold benzene.

200 parts of the dry chlorination product are suspended in 2000 parts of concentrated sulfuric acid. The whole is then slowly heated to about 170° C. to about 180° C., whereby strong evolution of hydrochloric acids sets in and the whole is dissolved to a yellow solution. After cooling, the 2.6-dichloro-3.7-anthraquinone-dicarboxylic acid, which is sparingly soluble in sulfuric acid, is precipitated. The reaction mixture is poured into water and the solid matter is filtered by suction and dried, whereby the pure acid is obtained in a crystalline form. It is easily soluble in sodium carbonate and melts at above 360° C. The isomeric 2.7-dichloro-anthraquinone-3.6-dicarboxylic acid which dissolves in concentrated sulfuric acid to a yellow solution and melts at 380° C., may be obtained in the same manner by starting from 2.5.5'-trimethyl-4.4'-dichlorobenzophenone.

(3) 60 parts of 2.5-dimethyl-4-chlorobenzophenone are chlorinated at about 170° C. to about 180° C. in 60 parts of trichlorobenzene, whilst exposing the mixture to ultraviolet light. Since the chlorination takes place in steps, it is possible to interrupt the chlorination when chiefly the ω-pentachloro-2.5-dimethyl-4-chloro-benzophenone has been formed. After the trichlorobenzene has been removed by distillation with steam, the semisolid residue is treated at about 90° C. to about 100° C. with concentrated sulfuric acid. After the evolution of hydrochloric acid has ceased, the mass is poured on ice, the solid matter is filtered by suction and washed until neutral. The 2-chloro-anthraquinone-3-carboxylic acid is dissolved from the residue by means of sodium carbonate solution, the solid matter is dried and recrystallized from nitrobenzene. It forms pure 2-chloro-anthraquinone-3-aldehyde, melting at 230° C.

(4) 50 parts of 3.6-dimethyl-4.2'.5'-trichlorobenzophenone, melting at 84° C.-95° C. and obtainable by condensation of 2-chloro-para-xylene with 2.5-dichlorobenzoylchloride according to the method of Friedel-Crafts, are chlorinated in the side chains at about 170° C. to about 180° C., in the presence of 100 parts of trichlorobenzene, while intensely stirring and exposing the mixture to a natural or artificial source of light. After the chlorination is finished, the product precipitates in a crystalline form. It is filtered by suction and dried and melts at 238° C.

60 parts of the dry chlorination product are suspended in 600 parts of concentrated sulfuric acid and heated at about 90° C. to about 100° C. until the evolution of hydrochloric acid has ceased. After cooling, the whole is poured on ice, filtered by suction and the solid product is washed until neutral and dried. The 2.5.8-trichloro-3-anthraquinone-carboxylic acid thus obtained forms a feebly yellow, crystalline powder. The acid is characterized by its difficultly soluble sodium and ammonium salts. It may be recrystallized from glacial acetic acid or nitrobenzene and melts at 264° C.

(5) 50 parts of ω-hexachloro-2.5-dimethyl-4-chlorobenzophenone, described in Example 1 are heated to boiling under reflux with 100 parts of caustic soda solution of 40° Bé. and 50 parts of water until nearly the whole has become dissolved. Thereupon, the solution is diluted with 500 parts of water, heated to boiling and filtered by suction. On acidifying the filtrate, 4-chlorobenzophenone-3.6-dicarboxylic acid precipitates. It is isolated and forms a colorless powder. It is easily soluble in alkalies and when heated with concentrated sulfuric acid it is transformed into 2-chloro-anthraquinone-3-carboxylic acid.

We claim:

1. The process which comprises completely chlorinating the methyl side chains of a dimethyl-chloro-benzophenone which contains in one benzene nucleus a methyl group in ortho-position to the ketonic group and in the same benzene nucleus a further methyl group and a chlorine atom as substituents, and which contains in the other benzene nucleus at least one unsubstituted ortho-position to the ketonic group, and subjecting the chlorination product thus obtained to the action of a saponifying agent.

2. The process which comprises completely chlorinating the methyl side chains of a dimethyl-chloro-benzophenone which contains in one benzene nucleus a methyl group in ortho-position to the ketonic group and in the same benzene nucleus a further methyl group and a chlorine atom as substituents, and which contains in the other benzene nucleus at least one unsubstituted ortho-position to the ketonic group, and treating the chlorination product thus obtained with concentrated sulfuric acid at a temperature of about 80° C. to about 180° C.

3. The process which comprises treating 2.5-dimethyl-4-chlorobenzophenone, dissolved in trichlorobenzene, with chlorine at a temperature of about 170° C. to about 180° C. for several hours, while simultaneously exposing the reaction mixture to ultra-violet light and treating the separated chlorination product thus obtained with concentrated sulfuric acid at a temperature of about 80° C. to about 90° C.

4. The process which comprises treating 2.5.4'-trimethyl - 4.5'-dichlorobenzophenone, dissolved in trichlorobenzene, with chlorine at a temperature of about 170° C. to about 180° C. for several hours, while simultaneously exposing the reaction mixture to ultraviolet light and treating the separated chlorination product thus obtained with concentrated sulfuric acid at a temperature of about 170° C. to about 180° C.

5. The process which comprises treating 2.5.5'-trimethyl 4.4'-dichlorobenzophenone, dissolved in trichlorobenzene, with chlorine at a temperature of about 170° C. to about 180° C. for several hours, while simultaneously exposing the reaction mixture to ultraviolet light and treating the separated chlorination product thus obtained with concentrated sulfuric acid at a temperature of about 170° C. to about 180° C.

6. The compound of the following formula:

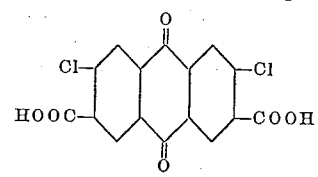

dissolving in concentrated sulfuric acid to a yellow solution and melting at 380° C.

GEORG KRÄNZLEIN.
MARTIN CORELL.
ERNST DIEFENBACH.